United States Patent
Farmer et al.

(10) Patent No.: US 6,255,617 B1
(45) Date of Patent: Jul. 3, 2001

(54) MOLD FOR MAKING BATTERY ELECTRODE

(75) Inventors: John E. Farmer; Carl A. Rotenberger; Randy J. Erwin, all of St. Petersburg, FL (US)

(73) Assignee: Farmer Mold & Machine Works, Inc., St. Petersburg, FL (US)

( * ) Notice: Subject to any disclaimer, the term of this patent is extended or adjusted under 35 U.S.C. 154(b) by 0 days.

(21) Appl. No.: 09/566,536

(22) Filed: May 8, 2000

Related U.S. Application Data
(60) Provisional application No. 60/136,571, filed on May 28, 1999.

(51) Int. Cl.[7] .............................. B23K 11/00; B23K 11/36
(52) U.S. Cl. ................... 219/78.01; 228/58; 228/901; 164/332; 164/334; 164/DIG. 1; 249/78
(58) Field of Search ................................. 219/78.01, 148; 228/141.1, 265, 212, 262.1, 19, 47.1, 51, 58, 901; 164/167, 168, 271, 332, 334, 339, DIG. 1; 429/163, 170; 29/623.1; 249/78, 160

(56) References Cited

U.S. PATENT DOCUMENTS

| | | | |
|---|---|---|---|
| 4,050,501 | * 9/1977 | Eberle | 164/68 |
| 4,119,137 | * 10/1978 | Eberle | 164/332 |
| 4,214,204 | * 7/1980 | Eberle | 324/437 |
| 4,458,742 | * 7/1984 | Eberle | 164/68.1 |
| 4,495,260 | * 1/1985 | Hardigg et al. | 429/180 |
| 5,478,981 | * 12/1995 | Farmer et al. | 219/86.1 |
| 5,626,984 | * 5/1997 | Albini | 429/178 |
| 5,885,731 | * 3/1999 | Shannon et al. | 429/175 |
| 6,008,480 | * 12/1999 | Lund | 219/633 |
| 6,030,723 | * 2/2000 | Nagano et al. | 428/181 |
| 6,059,848 | * 5/2000 | Shannon et al. | 29/623.2 |

FOREIGN PATENT DOCUMENTS
401239762 * 9/1989 (JP).

* cited by examiner

Primary Examiner—Tom Dunn
Assistant Examiner—Colleen Cooke
(74) Attorney, Agent, or Firm—Frijouf Rust & Pyle, P.A.

(57) ABSTRACT

An improved bushing mold is disclosed for an apparatus for welding a battery terminal post to a battery bushing. The battery terminal post is electrically connected to a battery plate disposed within a battery case and the battery bushing is secured to a battery case cover with the bushing having a central bushing aperture for receiving the battery terminal post therein when the battery case cover is located on the battery case. The bushing mold comprises an electrically conductive mold body having an insulating mold insert. The mold insert comprises a first and a second insert portion with the second insert portion being replaceable independent of the first insert portion.

30 Claims, 15 Drawing Sheets

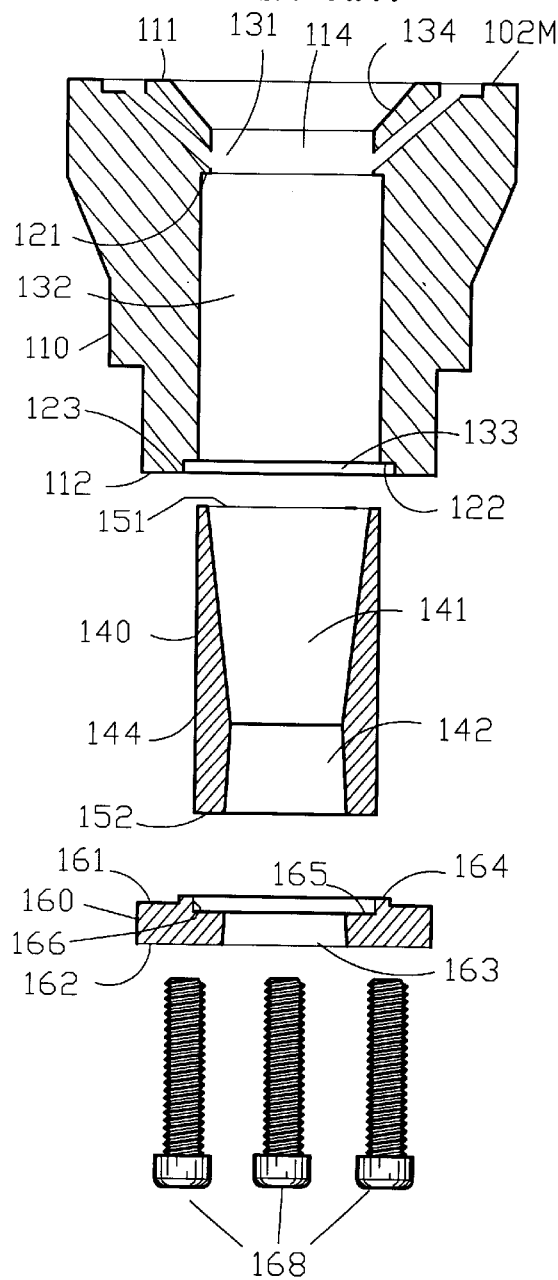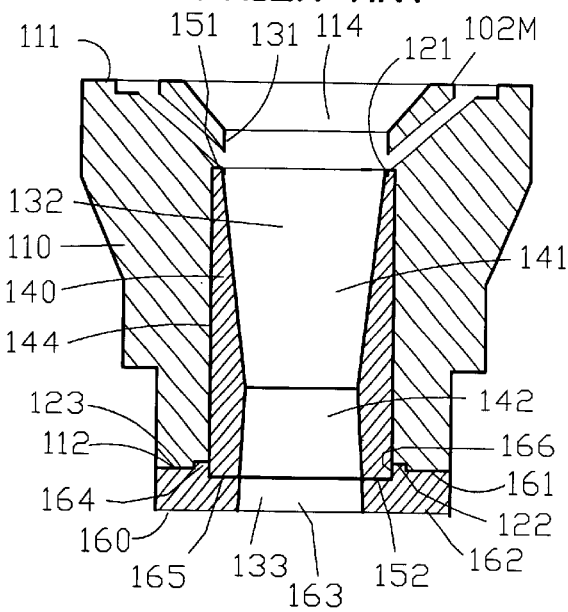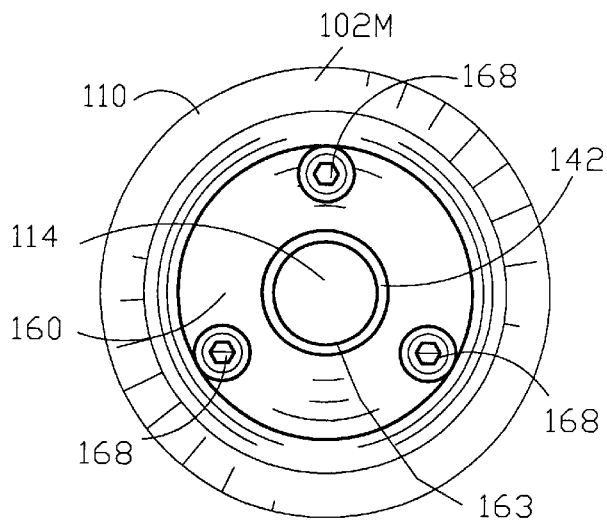
FIG. 10
FIG. 11
FIG. 12

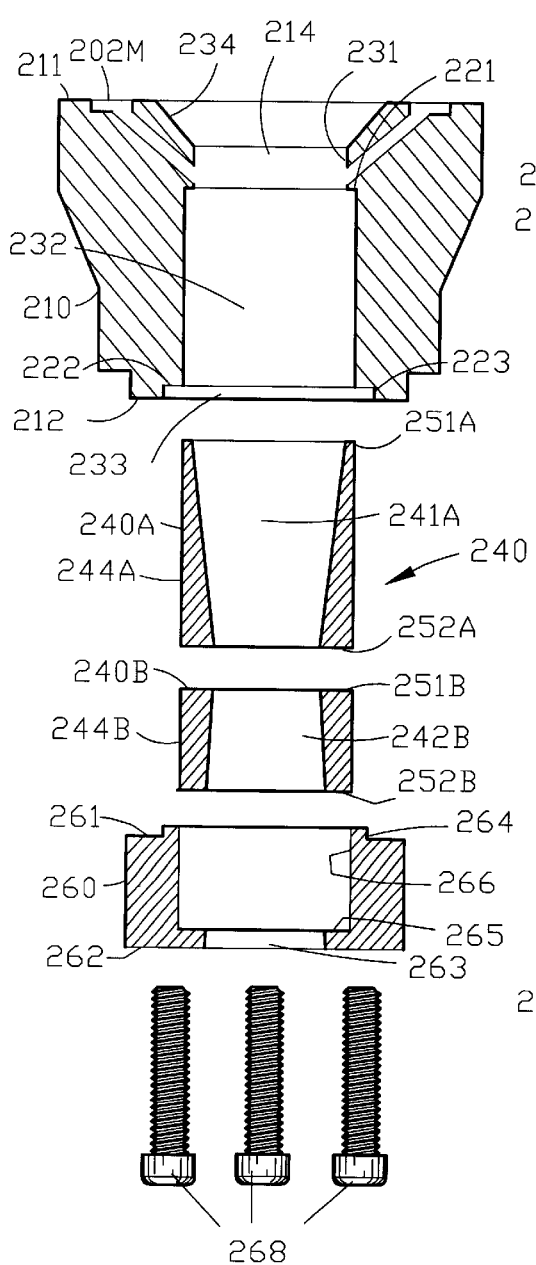
FIG. 16
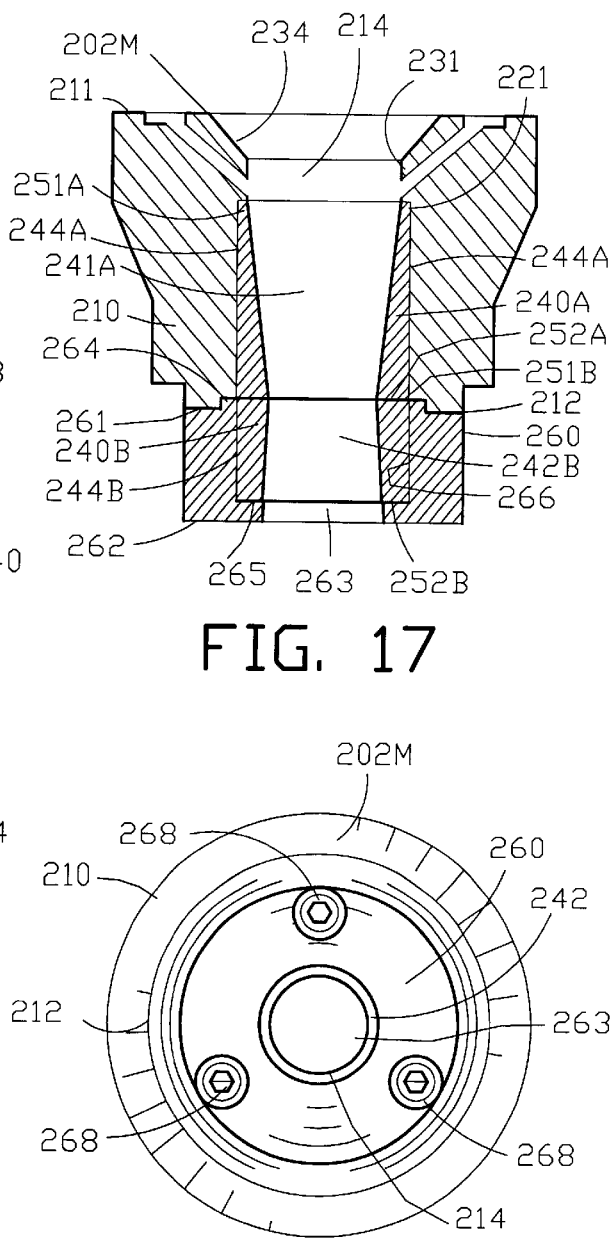
FIG. 17
FIG. 18

MOLD FOR MAKING BATTERY ELECTRODE

CROSS-REFERENCE TO RELATED APPLICATIONS

This application claims benefit of United States Patent Provisional application serial No. 60/136,571 filed May 28, 1999. All subject matter set forth in provisional application serial No. 60/136,571 is hereby incorporated by reference into the present application as if fully set forth herein.

BACKGROUND OF THE INVENTION

1. Field of the Invention

This invention relates to the construction of electrical storage batteries and more specifically to an apparatus for welding a battery terminal post to a battery bushing. Specifically, this invention relates to an improved battery bushing mold having a first insert portion and a second insert portion with the second insert portion being replaceable independent of the first insert portion.

2. Prior Art Statement

The fabrication and assembly of an electric storage battery such as a lead acid storage battery have undergone major changes over the decades. The changes in the fabrication and assembly of an electric storage battery have been implemented to increase the reliability of the electric storage battery, to reduce the material cost of the electric storage battery and reduce the labor cost associated with the assembly of the electric storage battery.

In some cases, many assembly processes of the electric storage battery have been automated to reduce the overall cost of manufacture. One process in the assembly of the electric storage battery that has been automated is the process of electrically connecting a battery post to a battery bushing.

Typically, the battery case comprises a rectangular open top case having a plurality of intercell partition walls. A plurality of battery plates are respectively received between the plurality of intercell partition walls for forming a plurality of battery cells. The plurality of battery plates between the plurality of partition intercell walls are interconnected by intercell connectors extending through the intercell partition walls. The intercell connectors connect the plurality of battery plates between the plurality of partition intercell walls in an electrical series configuration.

A positive and negative battery post extends upwardly from the battery plates disposed in the battery cells at opposed ends of the battery case for providing a positive pole at one end of the battery case and a negative pole on the other end of the battery case. The positive and negative battery posts extend above the level of the battery case.

A battery case cover includes a positive and negative battery bushing secured to a top of the battery case cover. When the battery case cover is placed over the battery case, the positive and negative battery posts are received within the positive and negative bushings of the battery case cover. The battery case cover is sealed to the battery case as should be well known to those skilled in the art.

The positive and negative battery post and the positive and negative battery bushings are made of a lead material in a lead acid battery. Various means have been devised in the past for electrically connecting the positive and negative battery posts to the positive and negative battery bushings secured to the battery case cover. One prior art method for electrically connecting the positive and negative battery posts to the positive and negative battery bushings is to utilize an open flame torch for melting the lead material to weld the positive and negative battery bushings to the positive and negative battery posts. Unfortunately, this prior art method provides inconsistent results and often produces electrical connections that appear to be satisfactory while being electrically defective. It should be appreciated by those skilled in the art that an improper or defective electrical connection between a battery post and a battery bushing is substantially detrimental to the overall performance of the electric storage battery.

In addition, the electrical connections of the positive and negative battery posts to the positive and negative battery bushings are essential to the safety of the electrical storage battery. If a battery post is not fused to the battery bushing, the electrical storage battery may leak acid and/or acid fumes from the battery bushing. There is also a hazard that the electric storage battery may explode causing damage to persona and/or property.

One novel method of electrically connecting the positive and negative battery posts to the positive and negative battery bushings utilizes an electrically conductive bushing mold and an electrically resistive electrode. The electrically conductive bushing mold was brought into engagement with the battery bushing and the resistive electrode was placed proximate the intersection of the battery bushing and the battery post. An electrical current was passed between the resistive electrode and the bushing mold for melting the battery bushing to provide the electrical connection between the battery post and the battery bushing. During the melting of the battery bushing, the resistive electrode was moved downwardly to ensure a substantial welding or bonding of the battery bushing and the battery post over desired vertical distance. The movement of the resistive electrode ensured that the battery bushing was properly electrically secured to the battery post.

An improvement to this novel method of electrically connecting the positive and negative battery posts to the positive and negative battery bushings utilizes an electrically conductive bushing mold and an electrically resistive electrode is set forth in our U.S. Pat. No. 5,478,981. U.S. Pat. No. 5,478,981 set forth a substantial advancement and improvement to the electrically resistive electrode.

Although the aforementioned prior art method provided electrical connections of superior reliability, this prior art process did have major disadvantages. A major disadvantage of this prior art method was the requirement to frequently replace an insulating mold insert in the battery bushing mold. In order to replace the insulating mold insert in the battery bushing mold, the battery bushing mold had to be returned to the manufacturer for refurbishment. Accordingly, the assembler of the battery cases was required to keep an inventory of replacement battery bushing molds to replace the battery bushing mold returned to the manufacturer.

Therefore, it is an object of the present invention to provide an improved battery bushing mold for welding a battery bushing to a battery post that overcomes the disadvantages of the prior art bushing molds and provides a substantial contribution to the battery assembly art.

Another object of this invention is to provide an improved battery bushing mold for welding a battery bushing to a battery post having a first insert portion and a second insert portion wherein the second insert portion is replaceable independent of the first insert portion.

Another object of this invention is to provide an improved battery bushing mold for welding a battery bushing to a battery post wherein the mold insert may be replaced by the assembler of the battery cases without the need to return the battery bushing mold to the manufacturer.

Another object of this invention is to provide an improved battery bushing mold for welding a battery bushing to a battery post with an increased useful life over the prior art battery bushing molds.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an apparatus for welding a battery terminal post to a battery bushing. In an apparatus for welding a battery terminal post to a battery bushing, the battery terminal post is electrically connected to a battery plate disposed within a battery case. The battery bushing is secured to a battery case cover with the bushing having a central bushing aperture for receiving the battery terminal post therein when the battery case cover is located on the battery case. The apparatus comprises a bushing mold for location on the battery bushing for connecting the bushing to a first connector of a power source for establishing electrical contact with the battery bushing. A resistive electrode extends longitudinally between a base end and a tip end. The base end is secured to the second connector of the power source and the tip end engages with the battery bushing to enable the flow of electric power to heat the resistive electrode for welding the battery terminal post to the battery bushing.

The bushing mold comprises a mold body having a first and a second body end with an aperture extending therethrough. A mold insert having a first and second tapered bore is receivable within the aperture of the mold body with the mold insert with the first tapered bore enabling the resistive electrode to enter therein for welding the battery terminal post to the battery bushing when the second tapered bore is engaged with the battery bushing.

The improvement comprises the mold insert having a first insert portion and a second insert portion with the first insert portion and second insert portion defining the first and second tapered bores, respectively. The second insert portion is replaceable independent of the first insert portion.

In a more specific embodiment of the invention, the bushing mold comprises a mold with a first and a second body end with an aperture extending therethrough. The aperture has a first and a second shoulder for respectively defining a first and second bore. A tapered bore is disposed between the first bore and the first body end of the mold body.

A mold cap with a first and a second mold cap end has an aperture extending therethrough. The aperture has a first and a second shoulder for respectively defining a first and a second bore. A mold insert having a first and second tapered bore is receivable within the aperture of the mold body. The first tapered bore of the mold insert enables the resistive electrode to enter therein for welding the battery terminal post to the battery bushing when the second tapered bore is engaged with the battery bushing.

The improvement comprises the mold insert having a first insert portion and a second insert portion with the first insert portion and a second insert portion defining the first and second tapered bores, respectively. The second insert portion is receivable within the aperture of mold cap portion of the mold body and is replaceable independent of the first insert portion.

In another embodiment of the invention, the first insert portion is fabricated from a material different than the second insert portion. Preferably, a spacer is interposed between the first shoulder of the mold body and the first end of the first insert portion, for ensuring intimate contact between the first insert portion and the second insert portion.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 10 is side sectional view of the disassembled prior art bushing mold of FIG. 7;

FIG. 11 is a side sectional view of the assembled prior art bushing mold of FIG. 10;

FIG. 12 is a bottom view of FIG. 9;

FIG. 16 is a side sectional view of the disassembled bushing mold of FIG. 13;

FIG. 17 is a side sectional view of the assembled bushing mold of FIG. 16;

FIG. 18 is a bottom view of FIG. 13;

Similar reference characters refer to similar parts throughout the several Figures of the drawings.

DETAILED DISCUSSION

Figure 1:
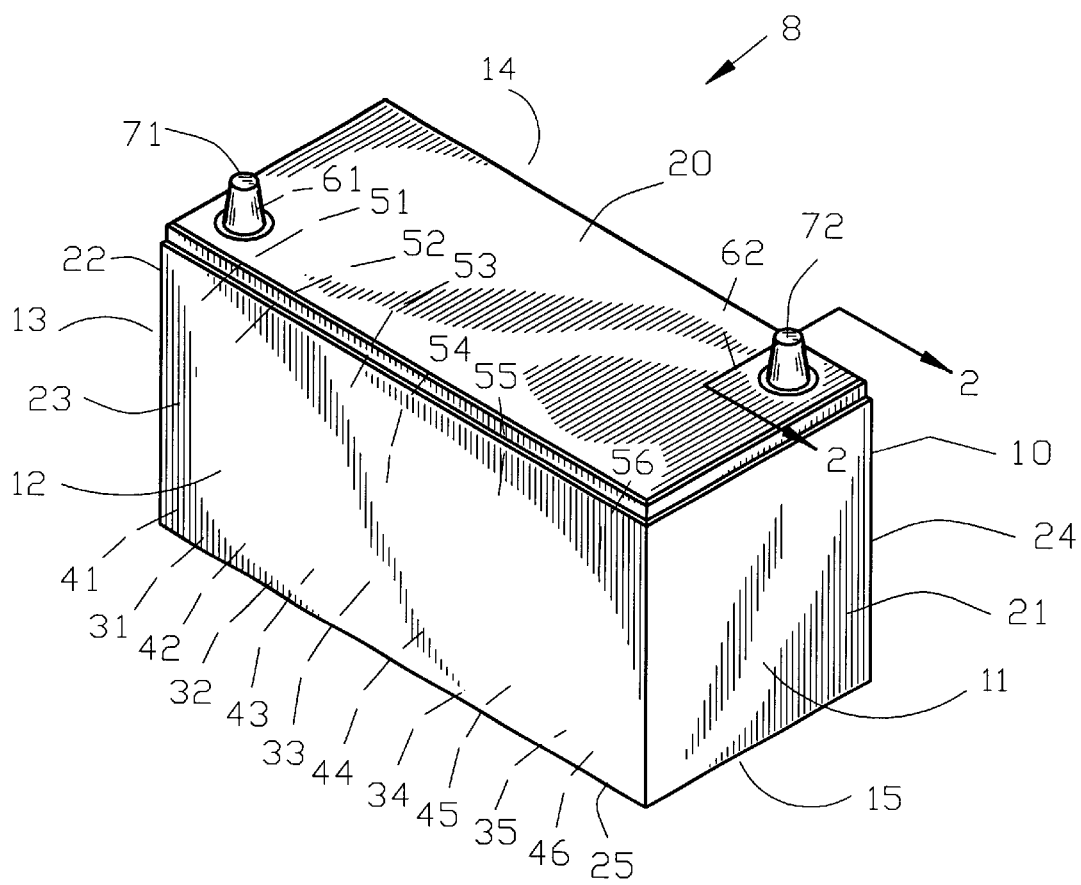
FIG. 1 is an isometric view of an electric storage battery.

FIG. 1 is an isometric view of electric storage battery 8 comprising a battery case 10 in the shape of an open-topped box comprising a first through fourth sidewall 11–14 and a bottom wall 15. A battery case cover 20 is secured to the battery case 10 for sealing the interior of battery case 10. Typically, the battery case 10 and the battery case cover 20 are fabricated from a polymeric material such as polyethylene or the like.

A plurality of intercell partitions 31, 32, 33, 34, and 35 (not shown) are disposed in the battery casing 10 parallel to the first and second sides 21 and 22 of the battery case 10 for to defining a plurality of battery cells 41–46 (not shown). A plurality of battery plates 51–56 (not shown) are disposed in the plurality of battery cells 41–46 and are connected by intercell connectors (not shown). The battery plates 51 and 56 are provided with terminal posts 61 and 62 (not shown) for connection to battery bushings 71 and 72 located on the battery case cover 20 as will be described in greater detail hereinafter.

Figure 2:
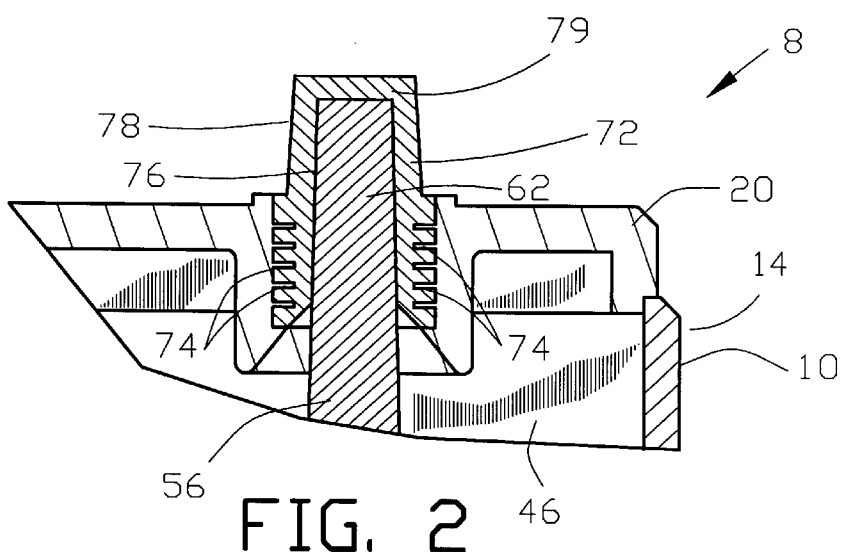
FIG. 2 is a partially sectional view along line 2—2 in FIG. 1 illustrating a battery terminal post and a battery terminal bushing.

FIG. 2 is a partially sectional view along line 2—2 in FIG. 1 illustrating the battery terminal post 62 and the battery bushing 72. A plurality of annular recesses 74 are defined in the battery bushing 72 for securing the battery bushing 72 to the battery case cover 20. Preferably, the battery case cover 20 is molded to extend into the plurality of annular recesses 74 of the battery bushing 72. The battery bushing 72 comprises a central aperture 76 for receiving the battery terminal post 62 therein and a tapered outer surface 78.

During the assembly of the electric storage battery 8, the plurality of battery plates 51–56 are positioned within the plurality of battery cells 41–46 and the plurality of battery plates 51–56 are interconnected by the intercell connectors (not shown). The terminal posts 61 and 62 of the battery plates 51 and 56 extend above the sidewalls 11–14. When the battery case cover 20 is secured to the battery case 10, the terminal posts 61 and 62 are received within apertures in the battery bushings 71 and 72 as shown by the battery terminal post 62 being received with central aperture 76 of the battery bushing 72 in FIG. 2. The battery terminal post 62 is welded to the battery bushing 72 by a weld 79 as shown in FIG. 2.

Figure 3:
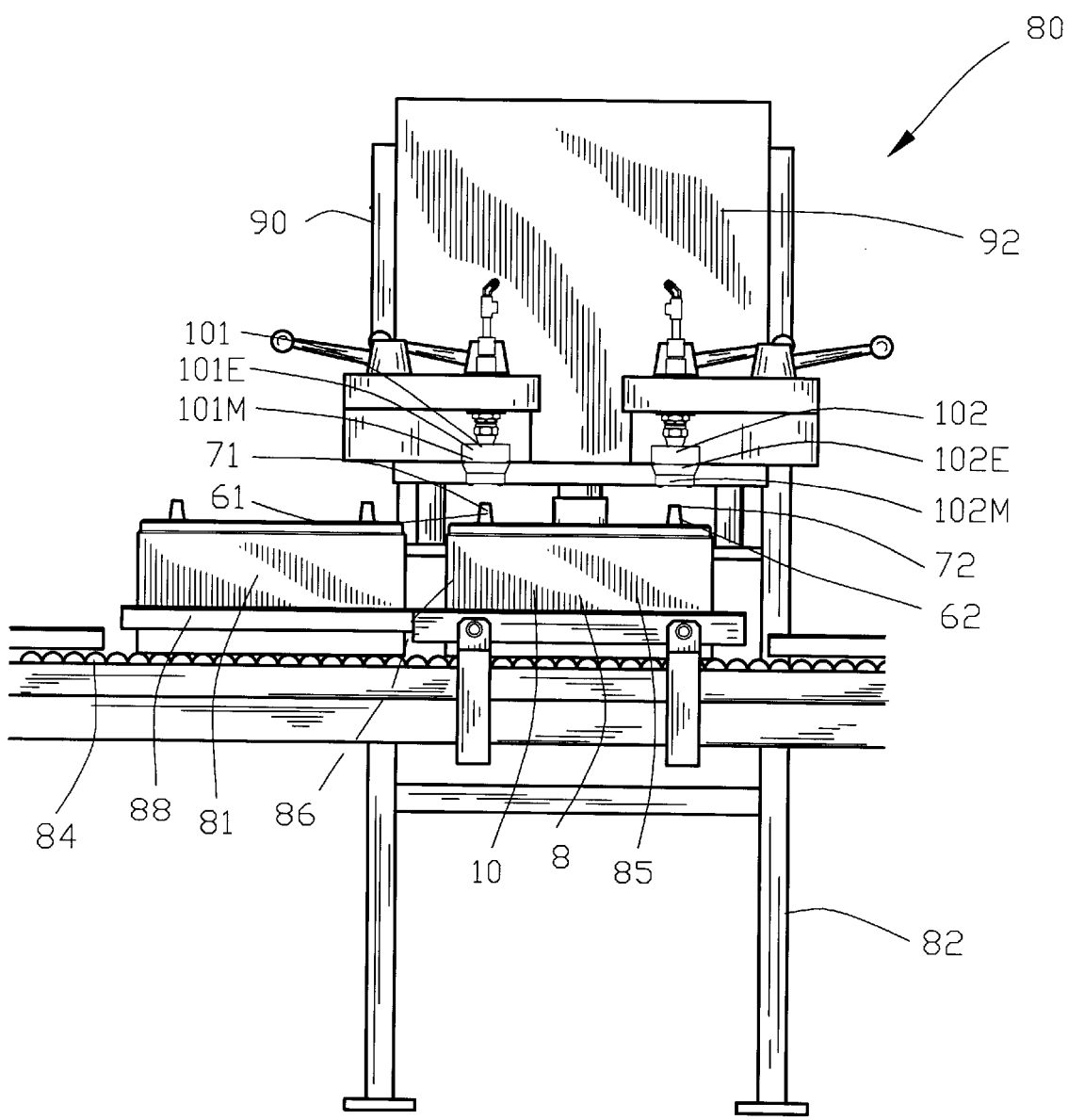
FIG. 3 is a front elevational view of an apparatus for welding the battery terminal post to the battery bushing with the apparatus shown in a raised position.
Figure 4:
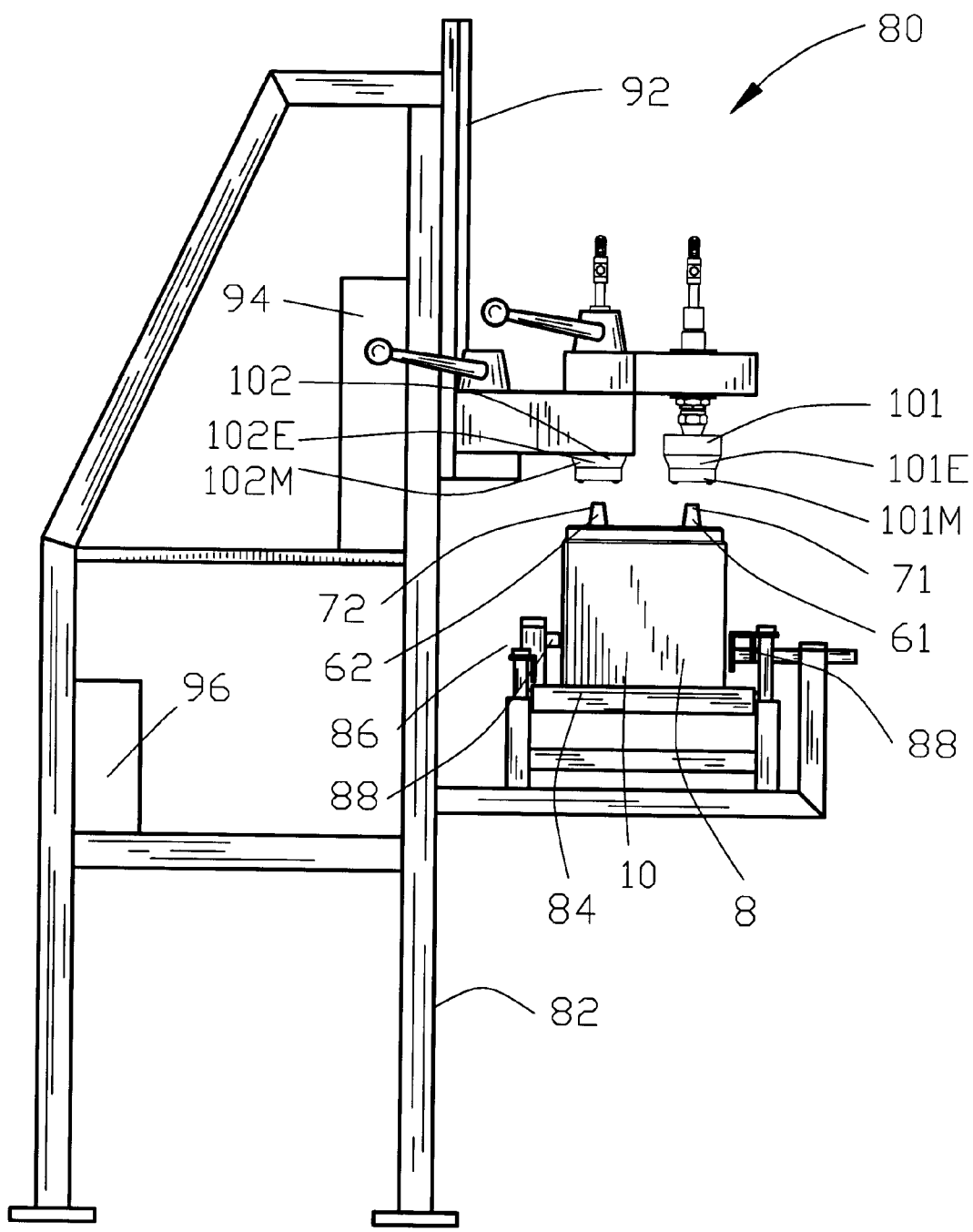
FIG. 4 is a side view of FIG. 3.

FIGS. 3 and 4 are front and side elevational views respectively of an apparatus 80 for welding the battery terminal posts 61 and 62 to the battery bushings 71 and 72. The apparatus 80 comprises a frame 82 supporting conveyor means shown as a conveyor belt 84 for transporting the storage battery 8 to a welding position 85 and for transporting the welded storage battery 8 from the welding position 85. The frame 82 supports a positioning means comprising a photosensor 86 and a side guide 88 for positioning the battery case 10 into the welding position 85.

An upstanding member 90 extends from frame 82 for supporting a movement actuator 92 by a moving means shown as a pneumatic cylinder 94. The pneumatic cylinder 94 moves the movement actuator 92 between a retracted position shown generally in FIGS. 3 and 4 and an extended position shown generally in FIGS. 5 and 6. A controller 96 interconnects the conveyor belt 84, the photosensor 86 and the pneumatic cylinder 94 for controlling the relative movements thereof.

A first and a second welder 101 and 102 is secured to the movement actuator 92 for movement between the retracted and the extended position. As will be described in greater detail hereinafter, each of the welders 101 and 102 comprises a resistive electrode 101E and 102E and a bushing mold 101M and 102M, respectively. The first and second welders 101 and 102 are connected to the controller 96 for controlling the welding operation in accordance with the operation of the apparatus 80.

The apparatus 80 of FIGS. 3–6 operates in the following manner. The conveyor belt 84 transports the storage battery case 8 toward the welding position 85 as shown in FIGS. 3 and 4. The photosensor 86 senses the arrival of the storage battery 8 on the conveyor belt 84 at the welding position 85 and signals the controller 96 to stop the conveyor belt 84 to position the storage battery 8 in the welding position 85 directly beneath the first and second welders 101 and 102.

Figure 5:
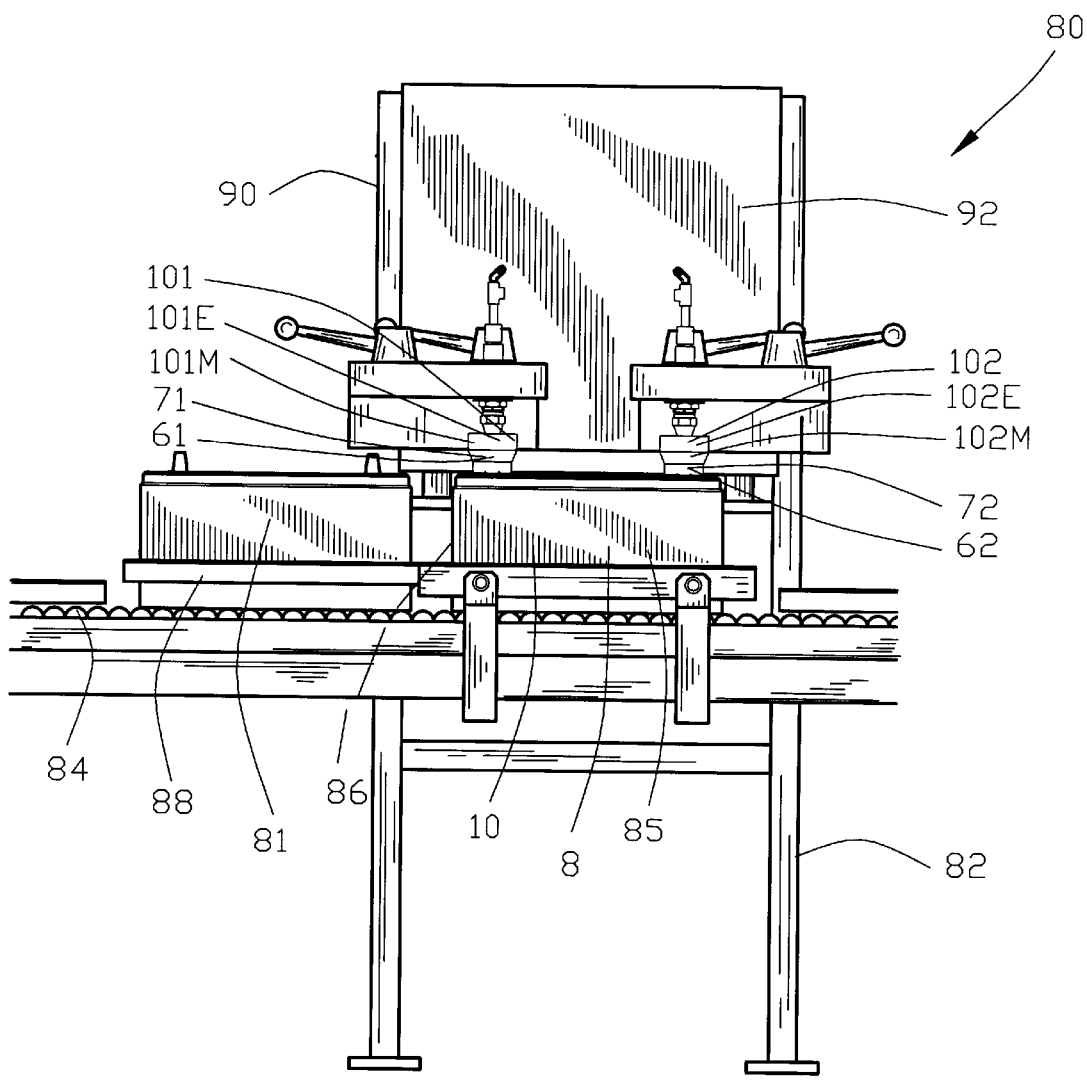
FIG. 5 is a front elevational view of the apparatus of FIG. 3 with the apparatus shown in a lowered position.
Figure 6:
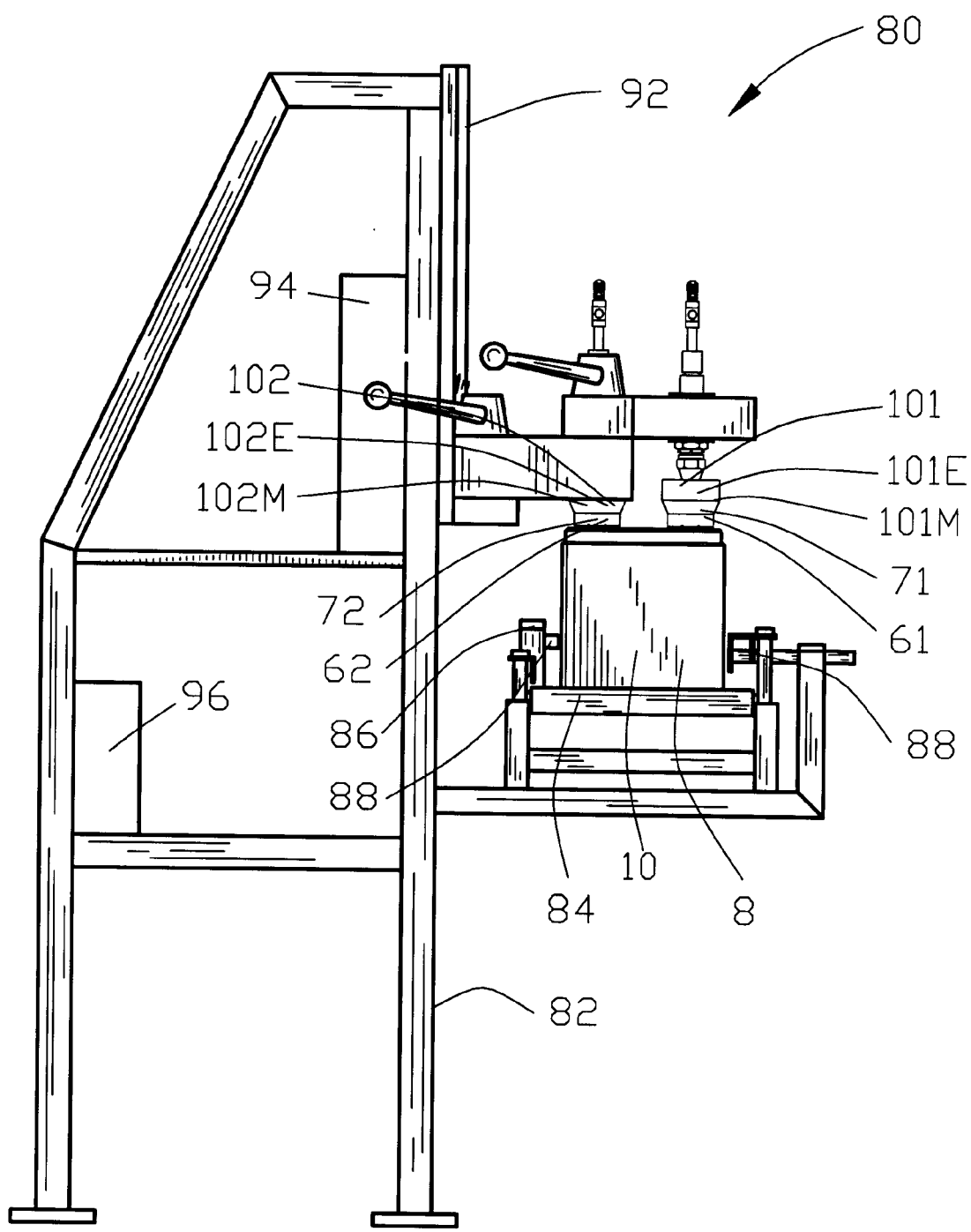
FIG. 6 is a side view of FIG. 5.
Figure 7:
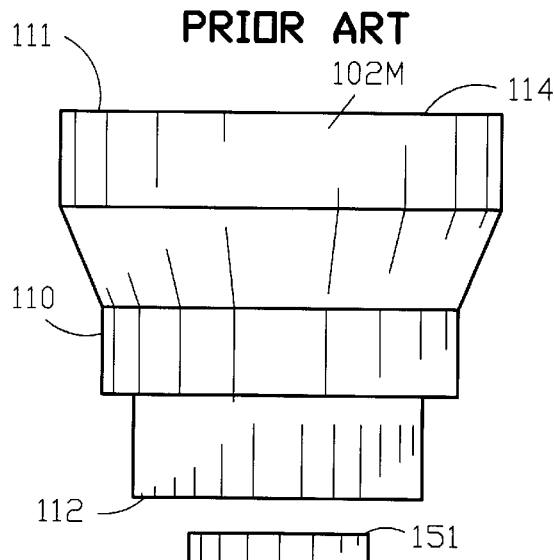
FIG. 7 is a side elevational view of a disassembled bushing mold of the prior art.
Figure 8:
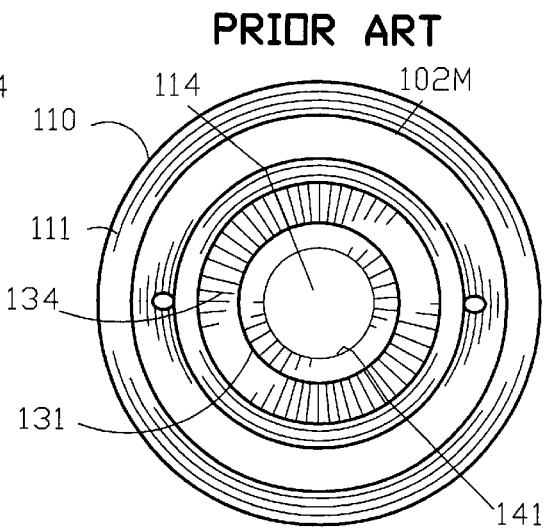
FIG. 8 is a top view of FIG. 7.
Figure 9:
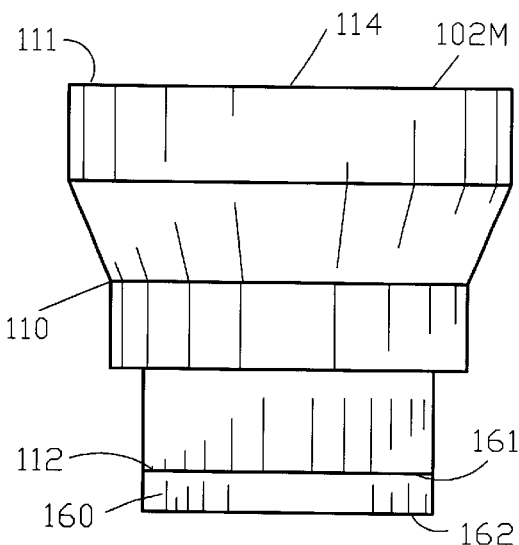
FIG. 9 is a side view of the assembled prior art bushing mold of FIG. 7.
Figure 13:
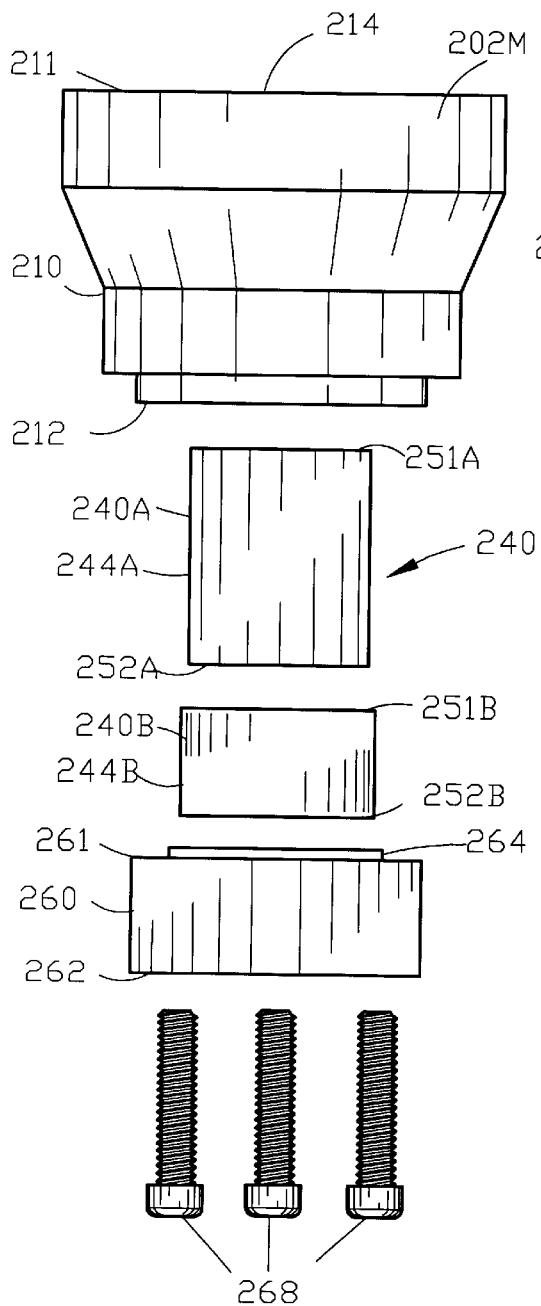
FIG. 13 is a side elevational view of a first embodiment of a disassembled bushing mold of the present invention.
Figure 14:
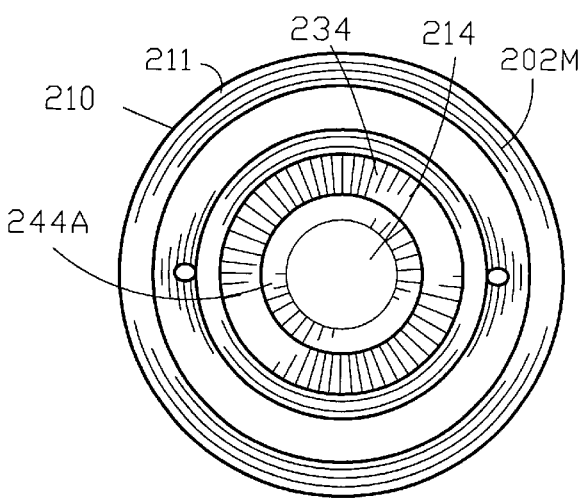
FIG. 14 is a top view of FIG. 13.
Figure 15:
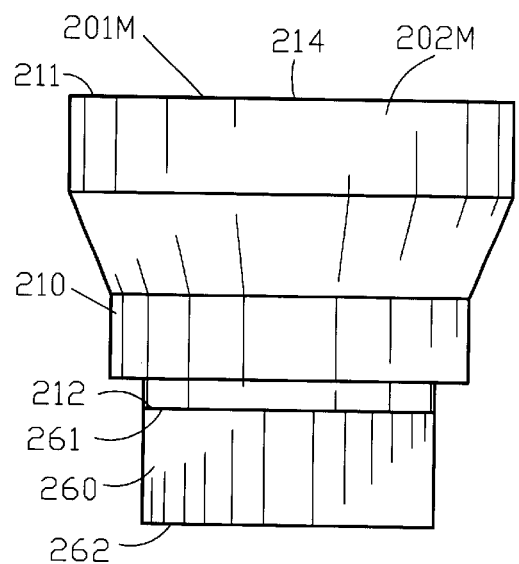
FIG. 15 is a side view of the assembled bushing mold of FIG. 13.

As shown in FIGS. 5 and 6, the pneumatic cylinder 82 moves the movement actuator 80 from the retracted position to the extended position whereat the first and second welders 101 and 102 make contact with the battery bushings 71 and 72. The controller 96 activates the first and second welders 101 and 102 to weld the terminal posts 61 and 62 to the battery bushings 71 and 72 as shown in FIG. 2.

After the battery terminal posts 61 and 62 have been welded to the battery bushings 71 and 72, the pneumatic cylinder 82 moves the movement actuator 80 from the extended position to the retracted position as shown in FIGS. 3 and 4. The controller 96 activates the conveyor belt 84 to transport the welded storage battery 8 from the welding position for further processing. Concomitantly therewith, the conveyor belt 84 transports a second storage battery 81 toward the welding position 85 for welding as previously described.

FIGS. 7–12 illustrate a bushing mold 102M of the prior art. The bushing mold 102M comprises a mold body 110 having a first and a second body end 111 and 112 with an aperture 114 extending therethrough. The aperture 114 has a first, a second, and a third shoulders 121–123 for respectively defining a first bore 131, a second bore 132 and a third bore 133. A tapered bore 134 is disposed between the first bore 131 and the first body end 111 of the mold body 110. The mold body 110 is integrally fabricated from a highly electrical conductive and thermal conductive material such as copper or the like.

A mold insert 140 comprises a first and second tapered bore 141 and 142 and a cylindrical outer surface 144 extending between a first and a second insert end 151 and 152. The mold insert 140 is receivable within the mold body 110 with the cylindrical outer surface 144 engaging with the second bore 132 of the mold body 110 and with the first insert end 151 engaging with the first shoulder 121 of the mold body 110. Preferably, the cylindrical outer surface 144 of the mold insert 140 formed a substantially press fit with the second bore 132 of the mold body 110. In the alternative, the mold insert 140 was affixed within the second bore 132 of the mold body 110 by an adhesive. The mold insert 140 is integrally fabricated from an electrical insulating and thermal insulating material such as ceramic material or the like.

The bushing mold 102M includes a mold cap 160 for securing the mold insert 140 within the mold body 110. The mold cap 160 is defined by a first and a second mold cap end 161 and 162 with a tapered aperture 163 extending therebetween. The tapered aperture 163 tapers inwardly from the second mold cap end 162 to the first mold cap end 161. Preferably, the mold cap 160 is integrally fabricated from a highly electrical conductive and thermal conductive material such as copper or the like.

The mold cap 160 includes a mold cap shoulder 164 defining a recess shoulder 165 delineating a recess bore 166. The second insert end 152 of the mold insert 140 is receivable within the recess bore 166. The mold cap shoulder 164 is receivable within, the third bore 133 of mold body 110 when the first mold cap end 161 engages the second body end 112 of the mold body 110. Concomitantly therewith, the second insert end 152 of the mold insert 140 engages the recess shoulder 165 of the mold cap 160.

A plurality of screws 168 secure the mold cap 160 to the mold body 110 for encasing the mold insert 140 within the mold body 110. The tapered aperture 163 of the mold cap 160 cooperates with the second tapered bore 142 of the mold insert 140 for engaging with the tapered outer surface 78 of the battery bushing 72 shown in FIG. 2.

The prior art bushing mold 102M provided superior electrical connections of superior reliability for welding the terminal posts 61 and 62 to the battery bushings 71 and 72 as shown in FIG. 2. A major disadvantage of the prior art bushing mold 102M was the requirement to frequently replace the mold insert 140 in the mold body 110. Since the mold insert 140 was essentially press fit into the mold body 110, the entire bushing mold, the entire bushing mold 102 had to be returned to the manufacturer for refurbishment. Accordingly, the assembler of the battery cases was required to keep an inventory of replacement battery bushing molds to replace the battery bushing mold returned to the manufacturer.

FIGS. 13–18 illustrate a first embodiment of a bushing mold 202M of the present invention. The bushing mold comprises a mold body 210 having a first and a second body end 211 and 212 with an aperture 214 extending therethrough. The aperture 214 has a first shoulder 221, a second shoulder 222 and a third shoulder 223 for respectively defining a first bore 231, a second bore 232, and a third bore 233. A tapered bore 234 is disposed between the first bore 231 and the first end 211 of the mold body 210. Preferably, the mold body 210 is integrally fabricated from a highly electrical conductive and thermal conductive material such as copper or the like. However, mold body 210 is integrally fabricated from a highly electrical conductive In this embodiment of the invention, a mold insert 240 comprises a first insert portion 240A and a second insert portion 240B. The first insert portion 240A has a first tapered bore 241A and a first cylindrical outer surface 244A extending between a first and a second end 251A and 252A of the first insert portion 240A. Preferably, the first insert portion 240A is integrally fabricated from an electrical insulating and thermal insulating material such as ceramic material or the like.

The first mold insert portion 240 is receivable within the mold body 210 with the cylindrical outer surface 244A engaging with the second bore 232 of the mold body 210 and with the first insert end 251A of the first insert portion 240A engaging with the first shoulder 221 of the mold body 210. Preferably, the cylindrical outer surface 244A of the first mold insert 240A formed a sliding fit with the second bore 232 of the mold body 210.

The second insert portion 240B has a second tapered bore 242B and a second cylindrical outer surface 244B extending between a first and a second end 251B and 252B of the second insert portion 240B. Preferably, the second insert portion 240B is integrally fabricated from an electrically insulating and thermally insulating material such as ceramic material or the like.

The bushing mold 202M includes a mold cap 260 for securing the mold inserts 240A and 240B within the mold body 210. The mold cap 260 is defined by a first and a second mold cap end 261 and 262 with a tapered aperture 263 extending therebetween. The tapered aperture 263 tapers inwardly from the second mold cap end 262 to the first mold cap end 261. The tapered aperture 263 of the mold cap 260 cooperates with the second tapered bore 242B of the second insert portion 240B for engaging with the tapered outer surface 78 of the battery bushing 72. Preferably, the mold cap 260 is integrally fabricated from a highly electrical conductive and thermal conductive material such as copper or the like.

The mold cap 260 includes a mold cap shoulder 264. The mold cap shoulder 264 is receivable within the third bore 233 of mold body 210. A recess 265 is defined within the mold cap 260 delineating a recess bore 268 within the mold cap 260.

The second insert portion 240B is receivable within recess bore 266 of the mold cap 260 with the cylindrical outer surface 244B of the second insert portion 240B engaging with the recess bore 266 of the mold cap 260. Preferably, the cylindrical outer surface 244B of the second insert portion 240B engages with the recess bore 266 of the mold cap 260 in a press fit engagement. In the alternative, the second insert portion 240 may be affixed within the recess bore 266 of the mold cap 260 by an adhesive.

The mold cap shoulder 264 is receivable within the third bore 233 of mold body 210 when the first mold cap end 261 engages the second body end 212 of the mold body 210. Concomitantly therewith, the first end 251B of the second insert portion 240B is in intimate contact with the second end 252A of the first insert portion 240A and the second end 252B of the second insert portion 240B engages with the recess shoulder 265 of the mold cap 260.

A plurality of screws 268 secure the mold cap 260 to the mold body 210 for encasing the first and second mold inserts 240A and 240B within the mold body 210. The tapered aperture 263 of the mold cap 260 cooperates with the second tapered bore 242 of the mold insert 240 for engaging with the tapered outer surface 78 of the battery bushing 72 shown in FIG. 2.

Preferably, the first insert portion 240A and the second insert portion 240B are fabricated from different materials based on function. The first insert portion 240A is primarily an electrical insulator to prevent the resistive electrodes 101E and 102E of FIGS. 3–6 from inadvertently contacting mold body 210. The resistive electrodes 101E and 102E will be explained and shown more fully with reference to FIGS. 19–22.

The second insert portion 240B provides the form and establishes the cosmetic appearance of the welded bushing 72 of the electric storage battery 8. The second insert portion 240B is subject to higher temperatures and greater thermal and mechanical stresses than first insert portion 240A. The second insert portion 240B may be fabricated from an electrically insulating and thermally insulating material such as ceramic material or the like which differs in composition from the fabrication material utilized in first insert portion 240A.

The present invention enables the second insert portion 240B to be replaced independent of the first insert portion 240A. Furthermore, the present invention enables the second insert portion 240B to be replaced independent of the first insert portion 240A by the assembler of the battery cases without the need to return the battery bushing mold to the manufacturer.

FIGS. 19–22 are sectional views of a portion of the apparatus 80 of FIGS. 3–6 illustrating the process of welding the battery bushing 72 to the battery post 62. The bushing mold 202M comprises the mold body 210 and the mold cap 260 with the first and second mold insert portions 240A and 240B encased therein. The first mold insert portion 240A defines the first bore 241A whereas the second mold insert portion 240B defines the second bore 242B. The tapered aperture 263 of the mold cap 260 cooperates with the second tapered bore 242B of the second insert portion 240B for engaging with the tapered outer surface 78 of the battery bushing 72.

Figure 19:
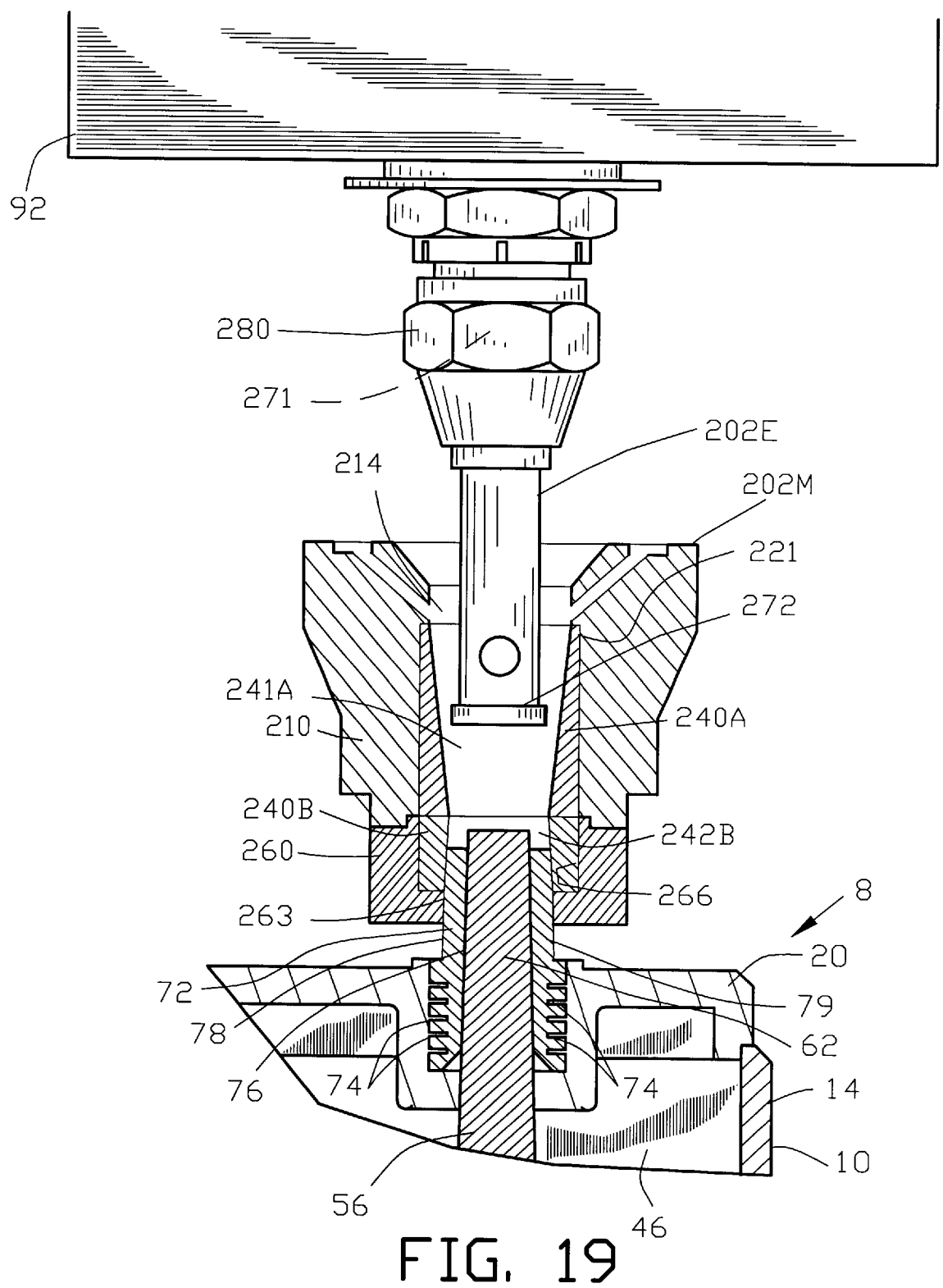
FIG. 19 is a side sectional view of the apparatus including the bushing mold and resistive electrode in a first position prior to welding.

FIG. 19 is a sectional view of bushing mold 202M positioned upon the battery bushing 72 of FIG. 2. The mold body 210 of the bushing mold 202M is connected to a first connector of a power source (not shown) for enabling the tapered aperture 263 of the mold cap 260 to make electrical contact with the tapered outer surface 78 of the battery bushing 72.

The resistive electrode 202E is positioned above the battery bushing 72 and battery post 62. The resistive electrode 202E is generally cylindrical and extends longitudinally between a base end 271 and a tip end 272. The base end 271 is secured by a coupler 280 for connecting the resistive electrode 202E to a second connector of the power source (not shown). The coupler 280 supplies a cooling fluid for cooling the resistive electrode 202E.

The first insert portion 240A is primarily an electrical insulator to prevent the resistive electrodes 202E from inadvertently contacting mold body 210. Accordingly, the first insert portion 240A suffers very little wear or abuse relative to the second insert portion 240B. The resistive electrodes 202E does not contact the first insert portion 240A. Similarly, the battery bushing 72 does not contact the first insert portion 240A.

Figure 20:
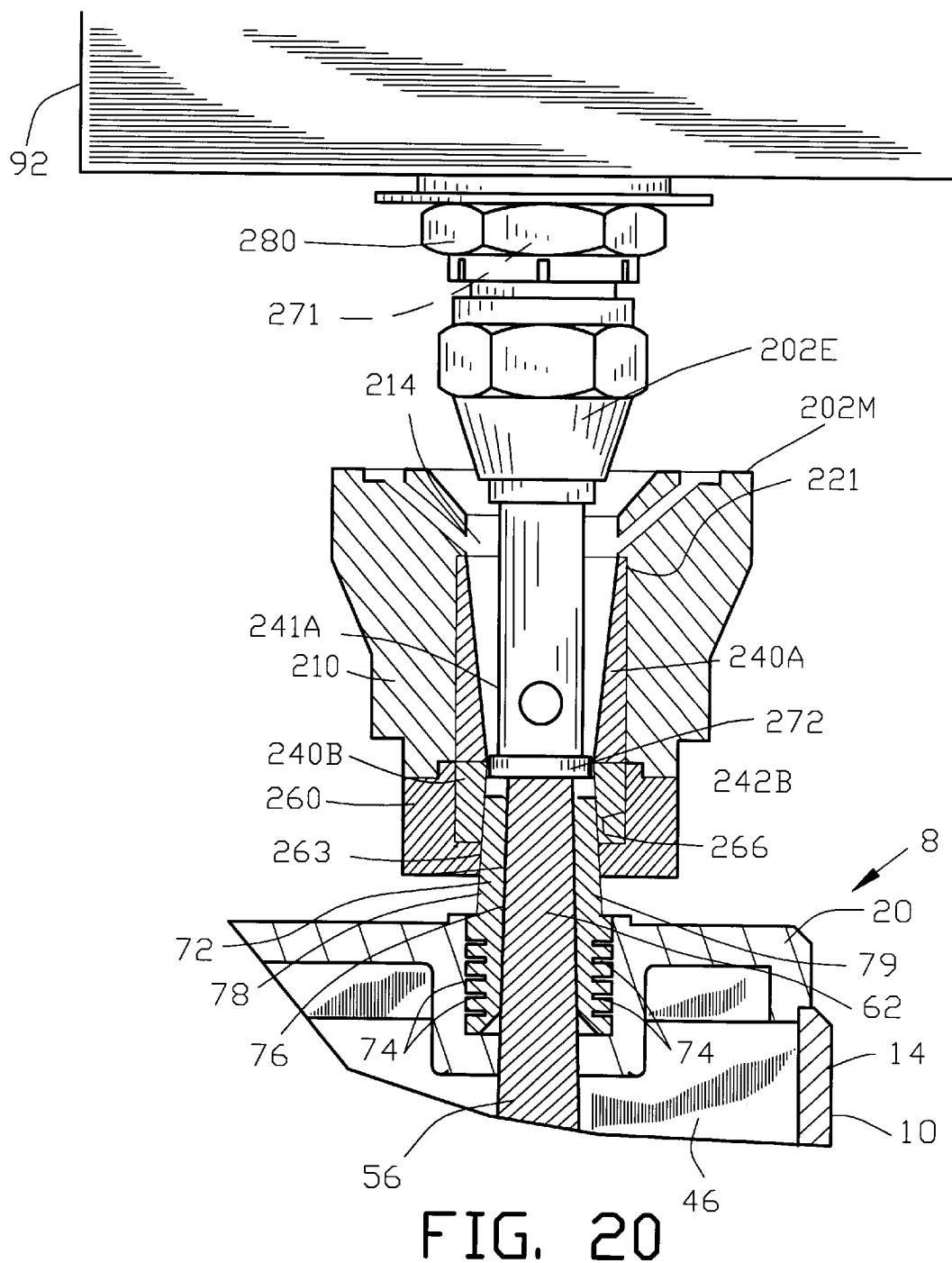
FIG. 20 is a side sectional view of the apparatus including the bushing mold and resistive electrode in a second position contacting the battery bushing.

FIG. 20 is a sectional view similar to FIG. 19 with the resistive electrode 202E contacting the battery bushing 72. The resistive electrode 202E is moved vertically downwardly for moving the tip end 272 into contact with the battery bushing 72. Preferably, the resistive electrode 202E is rotated relative to the battery bushing 72 for enabling the tip end 272 to remove any contaminants or oxides from the surface of the battery bushing 72.

After the contaminants or oxides are removed from the surface of the tip end 272, the controller 96 energizes the power source (not shown) for providing a flow of electric power between the resistive electrode 202E and the mold bushing 202M through the battery bushing 72 to heat the battery bushing 72. The electric power flows between the tip end 272 of the resistive electrode 202E and the tapered aperture 263 of the mold cap 260 of the mold bushing 202M. The heating of the battery bushing 72 melts both the battery bushing 72 and the battery post 62. As the melting of the battery bushing 72 and the battery post 62 continues, the resistive electrode 202E is moved vertically downward for melting a substantial upper portion of the battery bushing 72 and the battery post 62.

Figure 21:
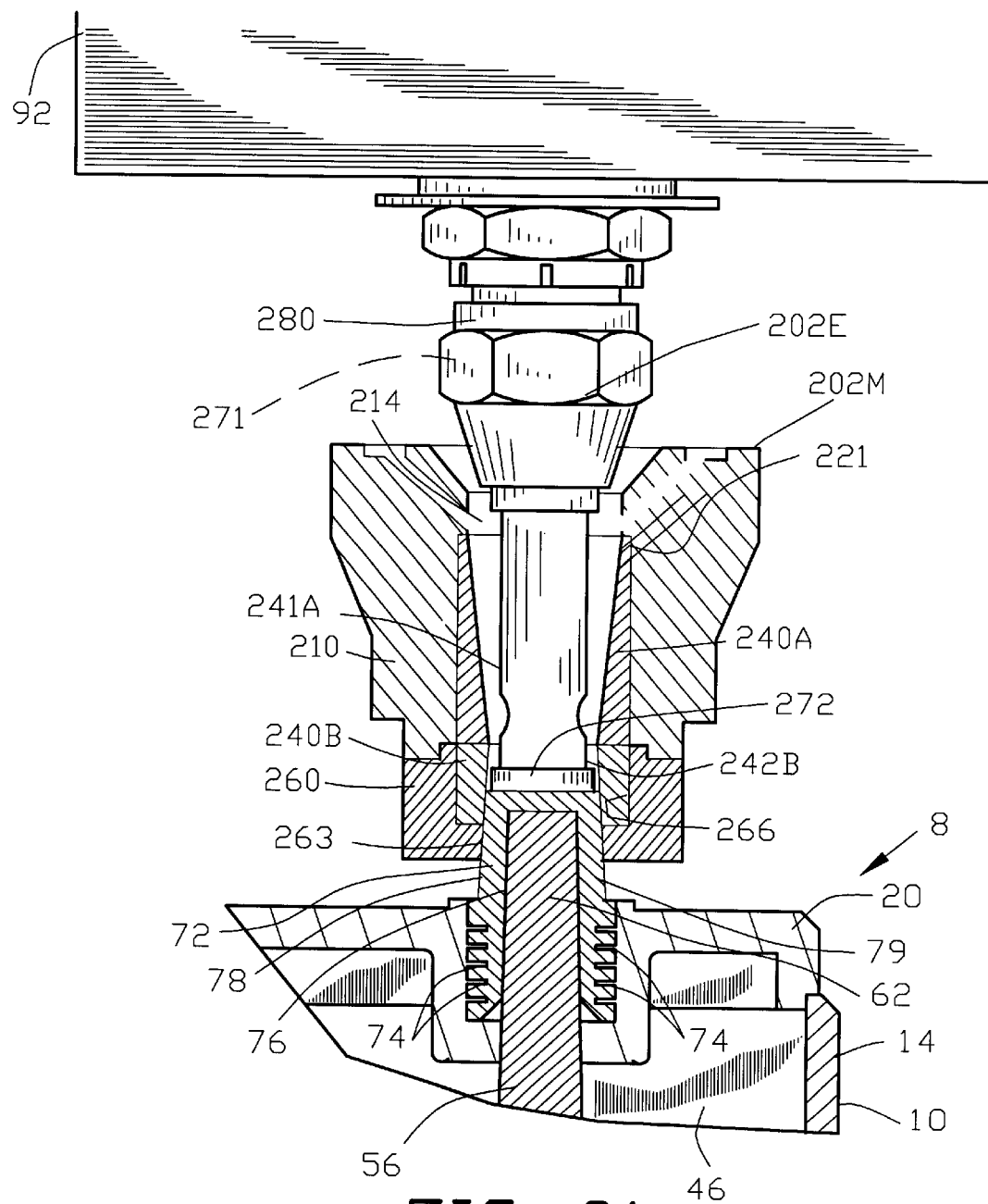
FIG. 21 is a side sectional view of the apparatus including the bushing mold and resistive electrode in a third position with the battery bushing being welded to the battery post.

FIG. 21 is a sectional view similar to FIG. 20 with the resistive electrode 202E moved vertically downward for welding the substantial upper portion of the battery bushing 72 and the battery post 62. When the resistive electrode 202E is moved vertically downward into the position shown in FIG. 21, the material of the substantial upper portion of the battery bushing 72 and the battery post 62 are melted and fused for forming a weld to electrically connect the battery bushing 72 and the battery post 62.

Figure 22:
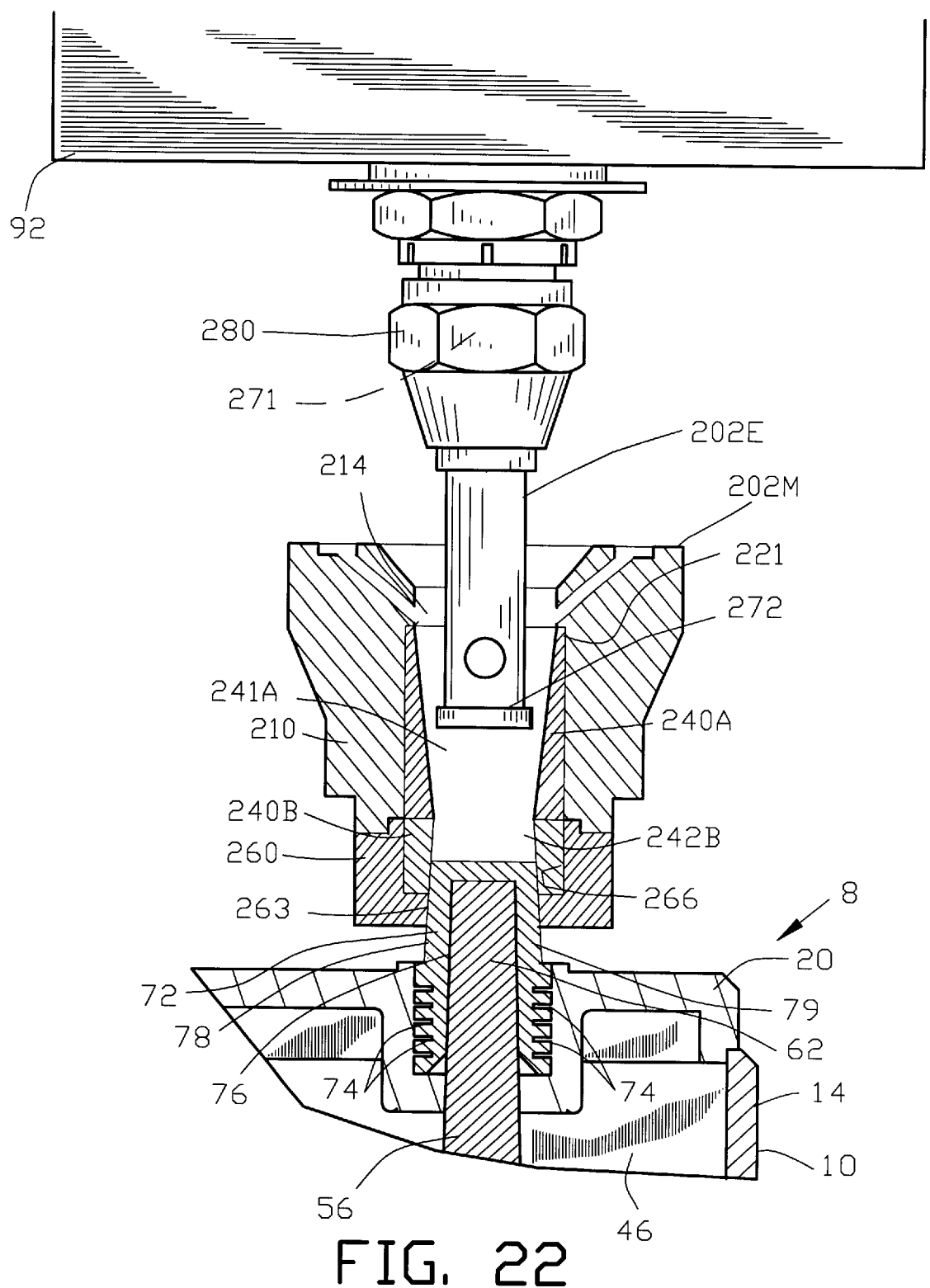
FIG. 22 is a side sectional view of the apparatus including the bushing mold and resistive electrode in a fourth position with the resistive electrode retracted and the battery bushing welded to the battery post.

FIG. 22 is a sectional view similar to FIG. 21 with the resistive electrode 202E positioned above the battery bushing 72 and battery post 62 after welding the battery bushing 72 to the battery post 62. After a vertically upward movement of the resistive electrode 202E from the position shown in FIG. 21, the molten lead of the battery bushing 72 and the battery post 62 fuses together and cools within the mold bushing 202M to form the battery bushing 72 into the desired finished cosmetic appearance. The second tapered bore 242B of the second insert portion 240B provides a form or a mold for the molten lead of the battery bushing 72 and the battery post 62. The molten lead of the battery bushing 72 and the battery post 62 fuse together and cool within the second tapered bore 242B to form the battery bushing 72 with the desired finished cosmetic appearance.

The welding of the substantial upper portion of the battery bushing 72 and the battery post 62 provides a substantial and reliable weld between the battery bushing 72 and the battery post 62. The integrity and depth of the welding of the battery bushing 72 to the battery post 62 is insured since the resistive electrode 202E has penetrated to a desired depth from the vertically downward movement of the resistive electrode 202E.

The second insert portion 240B is subject to higher temperatures and greater thermal and mechanical stresses than first insert portion 240A. Accordingly, the second insert portion 240B suffers greater wear and greater abuse than the first insert portion 240A. Any defect in the second tapered bore 242B of the second insert portion 240B will be reproduced in the battery bushing 72 as the molten lead fuses together and cools within the second tapered bore 242B to form the battery bushing 72. Any defect in the first tapered bore 241A of the first insert portion 240A will not be reproduced in the battery bushing 72.

The tapered aperture 263 of the mold cap 260 makes repeated engagement with the tapered outer surface 78 of the battery bushing 72 for making electrical connection thereto.

The mold cap 260 is subject to higher temperatures and greater thermal and mechanical wear than the mold body 210. To accommodate for the greater wear and greater abuse of the second insert portion 240B and the mold cap 260, the present invention provides three independent solutions.

Firstly, when the second insert portion 240B is made of the same material as the first insert portion 240A, the replacement of only the second insert portion 240B and the mold cap 260 results in a savings of approximately fifty (50%) percent over the replacement of the complete mold insert 140 as practiced by the prior art. Such a savings can be economically significant given the cost of many of the exotic ceramic material used for the mold inserts in the battery industry.

Secondly, the second insert portion 240B may be made of a different material as the first insert portion 240A. For example, the second insert portion 240B may be made from a more durable and more costly material than the first insert portion 240A. The use of the more durable material for only the second insert portion 240B results in a savings of approximately fifty (50%) percent over the use of the material in the complete mold insert 140 of the prior art.

Thirdly, the second insert portion 240B may be replaced independent of the first insert portion 240A by the assembler of the battery cases without the need to return the battery bushing mold to the manufacturer. The second insert portion 240B may be replaced by a semi-skilled worker of the assembler of the battery cases.

The second insert portion 240B may be replaced by removing the plurality of screws 268 securing the mold cap 260 to the mold body 210. The mold cap 260 is removed from the mold body 210. A new mold cap 260 containing the second insert portion 240B is secured to the mold cap 260 to the mold body 210 by the plurality of screws 268.

When the mold cap 260 is removed from the mold body 210, the first insert portion 240A may be slid out of the second bore 232 of the mold body 210. A new first insert portion 240A may be slid into the second bore 232 of the mold body 210 with the first shoulder 221 of the mold body 210.

In one example of the invention, the second insert portion 340 is constructed of a ceramic material which is cast and ground in a green state and subsequently fired to form the finished ceramic material. Other examples of the invention include Aluminum Oxide, Zirconium or a Macor ceramic material. It should be appreciated by those skilled in the art that various other material may be use with the present invention.

The bushing mold 202M of the present invention may be used with non-electrical processes for welding the battery terminal posts 61 and 62 to the battery bushings 71 and 72. The bushing mold 202M may be used with non-electrically heated electrodes. In the alternative, the electrodes may be heated by an electrical resistance located within the electrode. It should be appreciated by those skilled in the art that the bushing mold 202M of the present invention may be used with virtually any type of heat for welding the battery terminal posts 61 and 62 to the battery bushings 71 and 72.

FIGS. 23–26 illustrate a second embodiment of a bushing mold 302M of the present invention. The bushing mold 302M comprises a mold body 310 having a first and a second body end 311 and 312 with an aperture 314 extending therethrough. The aperture 314 has a first shoulder 321, a second shoulder 222 and a third shoulder 223 for respectively defining a first bore 331, a second bore 332, and a third bore 333. A tapered bore 334 is disposed between the first bore 331 and the first end 311 of the mold body 310.

The mold insert 340 comprises a first insert portion 340A and a second insert portion 340B. The first insert portion 340A has a first tapered bore 341A and a first cylindrical outer surface 344A extending between a first and a second end 351A and 352A of the first insert portion 340A.

In the second embodiment comprises a resilient spacer 355 interposed between first shoulder 321 of the mold body 310 and the first end 351A of first insert portion 340A.

The first mold insert portion 340 is receivable within the mold body 310 with the cylindrical outer surface 344A engaging with the second bore 332 of the mold body 310 and with the first insert end 351A of the first insert portion 340A engaging the spacer 355. The spacer 355 is interposed between the first insert portion 340A and the first shoulder 321 of the mold body 310. The cylindrical outer surface 344A of the first mold insert 340A forms a sliding fit with the second bore 332 of the mold body 310.

The second insert portion 340B has a second tapered bore 342B and a second cylindrical outer surface 344B extending between a first and a second end 351B and 352B of the second insert portion 340B.

The bushing mold 302M includes a mold cap 360 for securing the mold inserts 340A and 340B within the mold body 310. The mold cap 360 is defined by a first and a second mold cap end 361 and 362 with a tapered aperture 363 extending therebetween. The tapered aperture 363 tapers inwardly from the second mold cap end 362 to the first mold cap end 361. The tapered aperture 363 of the mold cap 360 cooperates with the second tapered bore 342B of the second insert portion 340B for engaging with the tapered outer surface 78 of the battery bushing 72.

The mold cap 360 includes a mold cap shoulder 364. The mold cap shoulder 364 is receivable within the third bore 333 of mold body 310. A recess 365 is defined within the mold cap 360 delineating a recess bore 368 within the mold cap 360.

The second insert portion 340B is receivable within recess bore 366 of the mold cap 360 with the cylindrical outer surface 344B of the second insert portion 340B engaging with the recess bore 366 of the mold cap 360. The second insert portion 240B may be received within the recess bore 266 of the mold cap 260 by a sliding engagement. In the alternative, the second insert portion 240 may be affixed within the recess bore 266 of the mold cap 260 by a press fit engagement or by an adhesive. The mold cap shoulder 364 is receivable within the third bore 333 of mold body 310 when the first mold cap end 361 engages the second body end 312 of the mold body 310. Concomitantly therewith, the first end 351B of the second insert portion 340B is in intimate contact with the second end 352A of the first insert portion 340A and the second end 352B of the second insert portion 340B engages with the recess shoulder 365 of the mold cap 360.

The resilient and compressible spacer 355 ensures intimate contact between the first insert portion 340A and second insert portion 340B. Further, the resiliency and compressibility of the spacer 355 adjusts to the expansion or shrinkage of the mold body 310 and the first and second insert portions 340A and 340B.

A plurality of screws 368 secure the mold cap 360 to the mold body 310 for encasing the first and second mold inserts 340A and 340B within the mold body 310. The tapered aperture 363 of the mold cap 360 cooperates with the second tapered bore 342 of the mold insert 340 for engaging with the tapered outer surface 78 of the battery bushing 72 shown in FIG. 2.

Figures 23, 24:
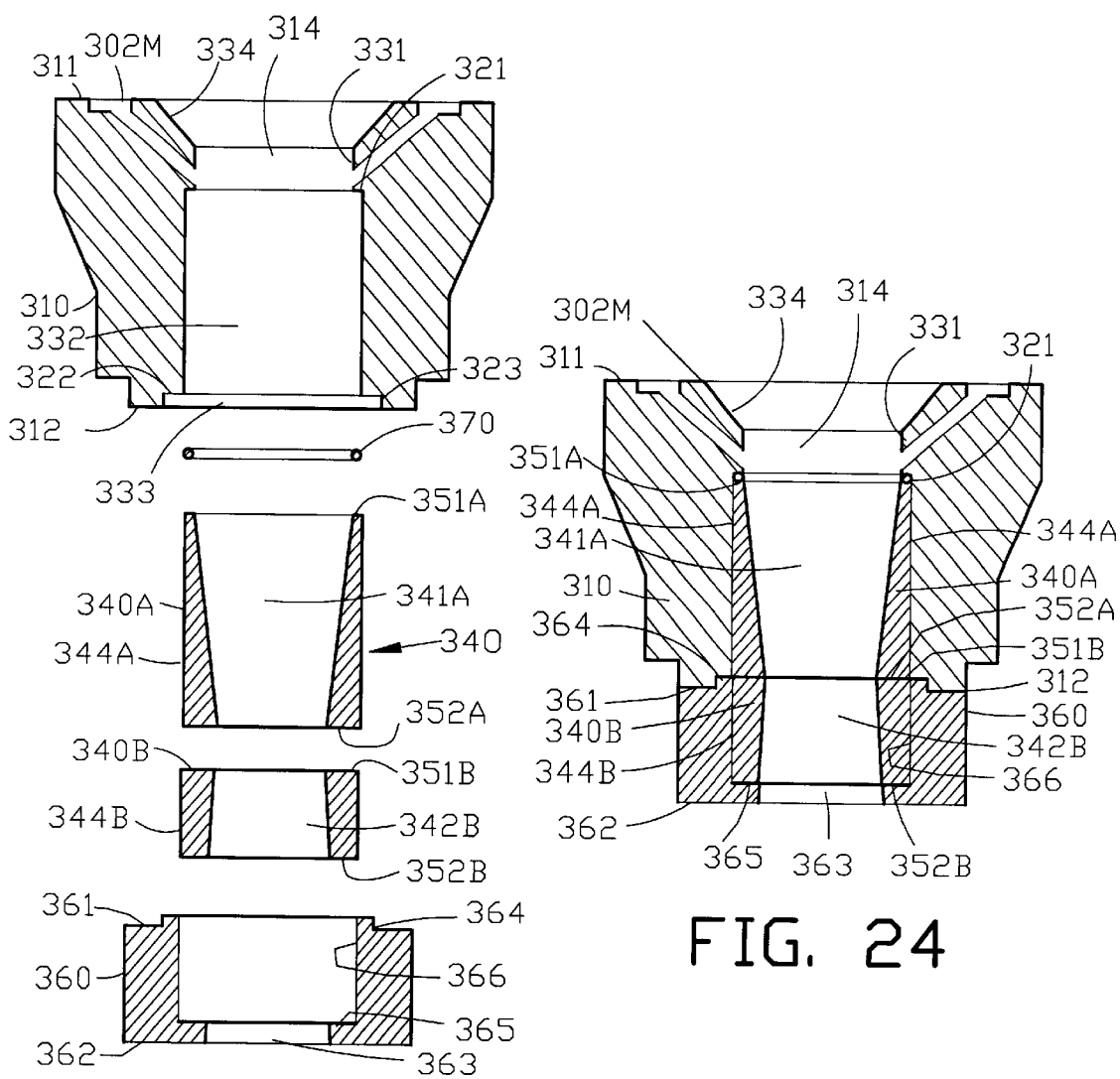
FIG. 23 is a side sectional view of a second embodiment of a disassembled bushing mold of a second embodiment of the present invention.
FIG. 24 is a side view of the assembled bushing mold of FIG. 23.
Figure 25:
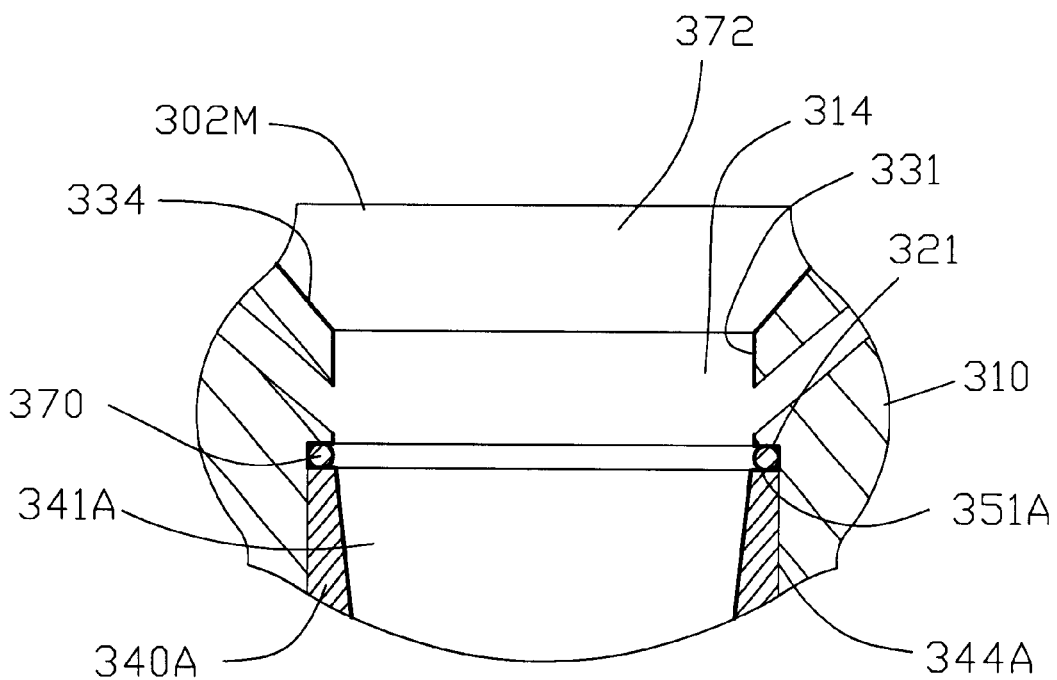
FIG. 25 is a magnified view of the second embodiment of a bushing mold of FIG. 24 illustrating an uncompressed spacer.
Figure 26:
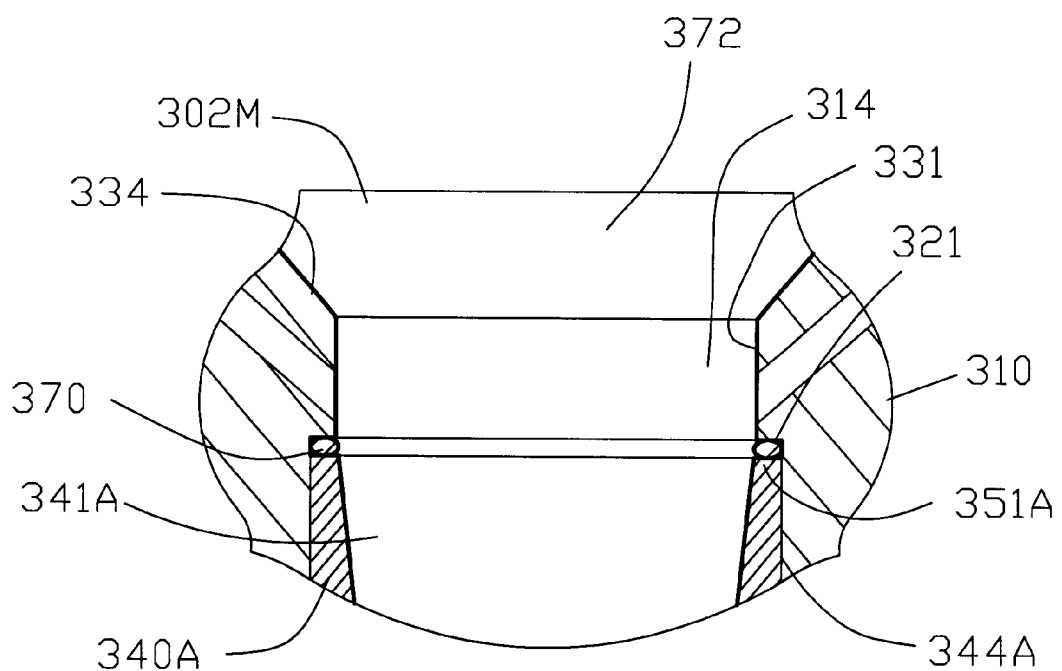
FIG. 26 is a magnified view similar to FIG. 25 illustrating a compressed spacer.

FIGS. 25 and 26 are magnified views of the second embodiment of the bushing mold 302M of FIGS. 23 and 24 illustrating the spacer 355. The spacer 355 is interposed between the first shoulder 321A of the mold body 310 and the first end 351A of the first insert portion 340A for ensuring intimate contact between the first insert portion 340A and the second insert portion 340B.

FIG. 25 illustrates the spacer 355 in an uncompressed position prior to affixing the mold cap 360 to the mold body 210. Preferably, the lengths of the first and second insert portions 340A and 340B are selected to compress the spacer 355 when the mold cap 360 is affixed to the mold body 210.

FIG. 26 illustrates the spacer 355 in a compressed position after affixing the mold cap 360 to the mold body 210. The coefficient of expansion of the mold body 210 is different than the coefficient of expansion of the first and second insert portions 340A and 340B. The metallic mold body 310 and mold cap 360 have a higher coefficient of expansion than the ceramic first and second insert portions 340A and 340B. As the temperature of the bushing mold 302M increases during the welding process, the temperature expands the length of the mold body 320 and the mold cap 360. The resiliency of the spacer 355 enables the first insert portion 340A to remain in intimate contact with the second insert portion 340B. Furthermore, the resiliency of the spacer 355 compensates for minor dimensional variations in manufacture of the mold body 310, the mold cap 360 and the first and second insert portions 340A and 340B.

The present disclosure includes that contained in the appended claims as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In an apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the apparatus comprising a bushing mold having a mold insert for receiving the battery bushing, the mold insert having a first and a second bore with the first bore enabling a welder to enter therein for welding the battery terminal post to the battery bushing when the second bore is engaging with the battery bushing, the improvement comprising:

the mold insert comprising a first insert portion and a second insert portion for defining the first and second bores, respectively; and the second insert portion being replaceable independent of the first insert portion.

2. An improvement as set forth in claim 1, wherein the first insert portion is fabricated from a material different than the second insert portion.

3. An improvement as set forth in claim 1, wherein the first insert portion and second insert portions are formed from an electrically non-conductive material.

4. An improvement as set forth in claim 1, wherein the first insert portion and second insert portions are formed from a ceramic material.

5. An improvement as set forth in claim 1, wherein the mold body is formed from an electrically conductive material.

6. An improvement as set forth in claim 1, wherein the mold body is formed from a copper material.

7. In an apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the apparatus comprising a bushing mold for location on the battery bushing and an electrode for welding the battery terminal post to the battery bushing, the mold insert having a first and a second bore with the first bore enabling a welder to enter therein for welding the battery terminal post to the battery bushing when the second bore is engaging with the battery bushing, the improvement comprising:

the mold insert comprising a first insert portion and a second insert portion for defining the first and second bores, respectively; and the second insert portion being replaceable independent of the first insert portion.

8. An improvement as set forth in claim 7, wherein the first insert portion is fabricated from a material different than the second insert portion.

9. An improvement as set forth in claim 7, wherein the first insert portion and second insert portion are formed from an electrically non-conductive material.

10. An improvement as set forth in claim 7, wherein the first insert portion and second insert portion are formed from a ceramic material.

11. In an apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the apparatus comprising a bushing mold and a resistive electrode being electrically connected to a first and a second terminal of a power supply, respectively;

the bushing mold having a mold insert for receiving the battery bushing therein with the bushing mold establishing electrical contact with the battery bushing, the resistive electrode having a tip end for engaging with the battery bushing to enable the flow of electric power to heat the resistive electrode for welding the battery terminal post to the battery bushing, a mold insert having a first and second tapered bore with the first tapered bore enabling the resistive electrode to enter therein for welding the battery terminal post to the battery bushing when the second tapered bore is engaging with the battery bushing, the improvement comprising:

the mold insert comprising a first insert portion and a second insert portion for defining the first and second tapered bores, respectively; and the second insert portion being replaceable independent of the first insert portion.

12. An improvement as set forth in claim 11, wherein the first insert portion is fabricated from a material different than the second insert portion.

13. An improvement as set forth in claim 11, wherein the first insert portion and second insert portions are formed from an electrically non-conductive material.

14. An improvement as set forth in claim 11, wherein the first insert portion and second insert portions are formed from a ceramic material.

15. An improvement as set forth in claim 11, wherein the mold body is formed from an electrically conductive material.

16. An improvement as set forth in claim 11, wherein the mold body is formed from a copper material.

17. In an apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the apparatus comprising a bushing mold for location on the battery bushing for connecting the bushing to a first connector of a power source for establishing electrical contact with the battery bushing and a resistive electrode extending longitudinally between a base end and a tip end with the base end being secured to the second connector of the power source and the tip end for engaging with the battery bushing to enable the flow of electric power to heat the resistive electrode for welding the battery terminal post to the battery bushing, the bushing mold comprising a mold with a first and a second body end with an aperture extending therethrough, with the aperture having a first, second, and a third shoulder for respectively defining a first, second and a third bore, with a tapered bore being disposed between the first bore and the first body end of the mold body, a mold cap having a first and a second mold cap end with an aperture extending therethrough, with the aperture having a first and a second shoulder for respectively defining a first and a second bore a mold insert having a first and second tapered bore being receivable within the aperture of the mold body with the first tapered bore enabling the resistive electrode to enter therein for welding the battery terminal post to the battery bushing when the second tapered bore is engaging with the battery bushing, the improvement comprising:

the mold insert comprising a first insert portion and a second insert portion with the first insert portion and second insert portion defining the first and second tapered bores, respectively;

the first insert portion being receivable within the aperture of the mold body;

the second insert portion being receivable within the aperture of the mold cap; and the second insert portion being replaceable independent of the first insert portion.

18. An improvement as set forth in claim 17, wherein the first insert portion is fabricated from a material different than the second insert portion.

19. An improvement as set forth in claim 17, wherein the fist insert portion and second insert portion are formed from an electrically non-conductive material.

20. An improvement as set forth in claim 17, wherein the first insert portion and second insert portion are formed from a ceramic material.

21. An improvement as set forth in claim 17, wherein the mold body is formed from an electrically conductive material.

22. An improvement as set forth in claim 17, wherein the mold body is formed from a copper material.

23. In an apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the apparatus comprising a bushing mold for location on the battery bushing for connecting the bushing to a first connector of a power source for establishing electrical contact with the battery bushing and a resistive electrode extending longitudinally between a base end and a tip end with the base end being secured to the second connector of the power source and the tip end for engaging with the battery bushing to enable the flow of electric power to heat the resistive electrode for welding the battery terminal post to the battery bushing, the bushing mold comprising a mold with a first and a second body end with an aperture extending therethrough, with the aperture having a first, and a second shoulder for respectively defining a first, and second bore, with a tapered bore being disposed between the second bore and the first body end of the mold body, a mold cap having a first and a second mold cap end with an aperture extending therethrough, with the aperture having a first and a second shoulder for respectively defining a first and a second bore, a mold insert having a first and second tapered bore being receivable within the aperture of the mold body with the mold insert with the first tapered bore enabling the resistive electrode to enter therein for welding the battery terminal post to the battery bushing when the second tapered bore is engaging with the battery bushing, the improvement comprising:

the mold insert comprising a first insert portion and a second insert portion with the first insert portion and second insert portion defining the first and second tapered bores, respectively;

the first insert portion being receivable within the aperture of the mold body;

the second insert portion being receivable within the aperture of the mold cap;

a spacer interposed between the first shoulder of the mold body and the first insert portion for urging the first insert portion into intimate contact between the second insert portion; and the second insert portion being replaceable independent of the first insert portion.

24. An improvement as set forth in claim 23, wherein the spacer is formed from a resilient material.

25. An improvement as set forth in claim 23, wherein the spacer comprises an O-ring.

26. An improvement as set forth in claim 23, wherein the first mold insert portion is fabricated from a material different than the second insert portion.

27. An improvement as set forth in claim 23, wherein the first and second mold insert portions are formed from an electrically non-conductive material.

28. An improvement as set forth in claim 23, wherein the first and second mold insert portions are formed from a ceramic material.

29. An improvement as set forth in claim 23, wherein the mold body is formed from an electrically conductive material.

30. An improvement as set forth in claim 23, wherein the mold body is formed from copper.

* * * * *